March 28, 1961
R. E. PURKHISER
2,977,528
WELDING CURRENT CONTROL
Filed Dec. 10, 1956
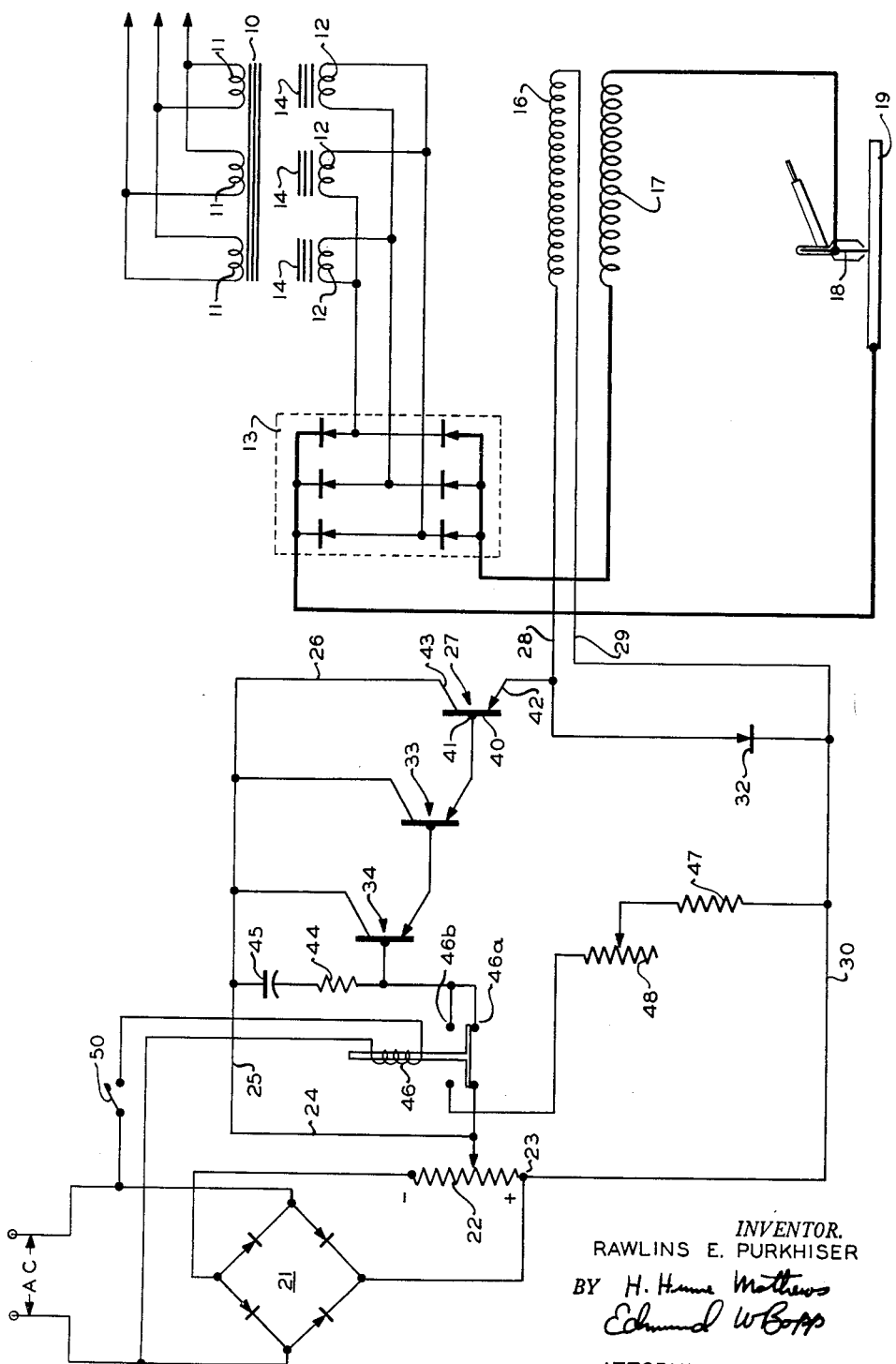
INVENTOR.
RAWLINS E. PURKHISER
BY H. Hume Mathews
 Edmund W Bopp
ATTORNEY & AGENT

United States Patent Office 2,977,528
Patented Mar. 28, 1961

2,977,528

WELDING CURRENT CONTROL

Rawlins E. Purkhiser, Springfield, N.J., assignor to Air Reduction Company, Incorporated, New York, N.Y., a corporation of New York Filed Dec. 10, 1956, Ser. No. 627,339

1 Claim. (Cl. 323—66)

This invention relates to methods and apparatus for the control of arc welding current and more particularly, to the controlled reduction of current at the end of a weld to reduce or eliminate the formation of an arc crater.

It is well known in the prior art to eliminate the crater normally formed at the end of a weld by reducing the welding current, thereby permitting the crater to fill in before the weld metal freezes. In manual welding this has been done by manipulation of a rheostat or some other control device by the operator. A common form of this device is a rheostat that can be controlled by the operator's foot. In machine arc welding, other automatic devices have been provided which are the mechanical equivalent of those used in manual welding. In most cases the crater filling devices are electro-mechanical although devices have been built in the past that were wholly electrical. The design of the crater filling device depends in part on the type of welding machine to which it is applied. In the case of the transformer type welding machine in which the welding current is controlled by the degree of saturation of a saturable reactor, the crater filling is accomplished by manipulating a rheostat which serves to reduce the direct current excitation of the saturable reactor, to effectively increase the internal impedance of the machine and reduce its output. Alternatively the direct current excitation of the saturable reactor may be controlled wholly electrically by the use of electron tubes. In the case of welding generators of the rotating type, the current is generally varied by controlling the generator field excitation. Accordingly crater filling can be provided by reducing the field strength, to thereby reduce the current output of the machine at the end of the weld. As before, this involves controlling a current, the field current, which may be done electro-mechanically or wholly electrically. Regardless of the type of machine employed the value of the control current which must be varied is relatively large. As a result, it is difficult and expensive to utilize electron tubes for such control. In addition the use of electron tubes requires a high voltage source for their operation. In no case is such a high voltage source available in a welding machine without it being separately and especially provided. If rheostats or other electromechanical impedance devices are to be employed to provide the necessary gradual change of current, they must be capable of handling relatively high currents, be capable of withstanding the repeated use to which they need necessarily be put, and must be capable of actuation through their full range in a short and adjustable time. Particularly in the case of automatic devices, the power requirements of the actuating motor, and the inertia of the devices play important roles in the design and operation. As a practical matter it is virtually impossible to achieve in a single device all of the above requirements for the control device. The requirements of high current capacity, low inertia, mechanical durability, and low cost are substantially incompatible. Because of the mechanical problems of wear and inertia, it is obviously an advantage to regulate the control current in any type of welding machine by wholly electrical means. However, experience has shown that to perform the desired functions with electron tubes, the components become expensive and the circuits complex. Electron tubes are essentially high voltage low current devices, whereas the problem requires control of relatively high currents and low voltages. Typical control currents are of the order of 4 amperes or more and the available voltages in the welding machines are normally of the order of 20 volts.

It is an object therefore of the present invention to provide a novel electrical control for welding machines.

It is another object of the present invention to provide a crater filling device for arc welding machines that is inexpensive, durable and small in size and weight.

A further object of the present invention is to provide a crater eliminator that utilizes a transistor to control the decay of welding current at the end of the weld.

These and other advantages of the invention will be pointed out or will become apparent from the following detailed description of one embodiment of the invention shown for purposes of illustration in the accompanying drawing.

In accordance with the present invention, a transistor is incorporated in the circuit of the control winding of the welding machine, in such a manner as to act as a low impedance during welding. At the end of the weld the effective impedance of the transistor increases at a rate determined by the controlled charge of a capacitor to reduce the current in the control winding and thus reduce the current output of the welding machine and prevent the formation of a crater in the finished weld.

The single figure for the drawing illustrates schematically a welding machine incorporating the present invention.

Typical examples of welding power supplies of the transformer type in which the output current is controlled by a saturable reactor are disclosed in United States Patents 2,535,154, issued December 26, 1950, to S. Oestreicher; 2,644,109, issued June 30, 1953, to A. Mulder; and 2,679,024, issued May 18, 1954, to S. Oestreicher.

For purposes of illustration the present invention is described herein as applied to a direct current welder of the transformer rectifier type in which current control is derived from the impedance presented by a saturable reactor.

The particular welder schematically illustrated comprises a three phase transformer which consists of a standard three-legged core 10, each leg having a primary winding 11, energized by one phase of a source of three phase power, and a corresponding secondary winding 12. The terminals of each of the secondary windings are appropriately connected to a bank of rectifiers 13, such as selenium rectifiers, for full wave rectification of the three phase transformer output. The output of the transformer is controlled by means of three cores 14 which are linked with the respective transformer secondary windings and with two control windings, designated 16 and 17 respectively. Control winding 17 is series connected between the output of the rectifiers and the welding arc formed between a welding electrode 18 and the work 19 to be welded, and serves to partially saturate the control cores 14. Control winding 16 is separately energized and acts in a similar manner to provide additional flux in the control cores 14. For a complete and detailed disclosure of the construction and operation of a welder of the type here illustrated, reference should be made to Mulder Patent No. 2,644,109 dated June 30, 1953. It is sufficient to point out herein, for the purposes of this invention, that the higher the current in windings 16 and 17, and the more nearly saturated control cores 14 become, the greater is the current output of the welding machine. The degree of partial saturation of the control cores 14 as a result of current in winding 17 is automatically established by the magnitude of the welding current. Actual welding current control is therefore effected by control of the current in control winding 16 which is independently energized. Increased current in the control winding 16 in effect means decreased impedance in the transformer secondary circuits and increased welding current. As has previously been pointed out the present invention deals with the methods and apparatus by which the energization of winding 16 is controlled and more particularly how it is controlled at the end of a weld to prevent the formation of a crater.

In the particular embodiment of the invention illustrated control winding 16 is energized from a bridge type rectifier 21 energized from a 26 volt A.C. supply. The output of the rectifier 21 is passed through a load resistor or voltage divider in the form of potentiometer 22. Without regard to the transistors in the circuit which, as will be explained hereinafter, offer low impedance to the passage of current, it is readily apparent that the current passing through winding 16 results from the voltage appearing between the variable tap of potentiometer 22 and the junction point 23 at one end of the potentiometer. The conductive path for the current energizing control winding 16 is from the variable tap of potentiometer 22, through conductors 24, 25, 26, transistor 27, conductor 28, winding 16, and conductors 29 and 30 back to potentiometer 22. In the particular circuit illustrated the polarity of rectifier 21 is such that the circuit junction point 23 is positive with respect to the variable tap of potentiometer 22. Rectifier 32, in parallel with control coil 16 is preferably included in the circuit for the purpose of suppressing the effects of any excess voltages that may be induced in the system such as the voltage induced by the decay of the field surrounding control winding 16 when the current energizing this winding is interrupted. Considering the main control transistor 27, as well as the amplifier transistors 33, 34 as fixed impedances, it is obvious that the value of the current in winding 16 may be controlled by the setting of potentiometer 22.

The main control transistor 27 in the circuit of the control winding 16, as well as the amplifier or driver transistors 33 and 34, each consist essentially of a semiconducting body such as a crystal of germanium and a base electrode, an emitter electrode, and a collector electrode in contact with the body. In the main control transistor 27 the body is designated 40, the base electrode 41, the emitter electrode 42, and the collector electrode 43. Such transistors are now well known and a further description thereof is not believed to be necessary. The transistors schematically illustrated are of the PNP type i.e., the collector is negative with respect to the base.

The main control transistor has its emitter and collector electrodes in series circuit with the winding 16 and its base electrode connected to the emitter of the amplifier or driver transistor 33. The collector electrode of amplifier transistor 33 is connected to conductor 25 and the base is connected to the emitter of amplifier transistor 34. The collector electrode of transistor 34 is also connected to conductor 25 and the base electrode is connected into a circuit which includes a small current limiting resistor 44, a capacitor 45, two pair of contacts 46a and 46b of a relay having an operating coil designated 46, and a resistance comprising a fixed resistance 47 and an adjustable resistance 48. The capacitor 45, the resistor 44, the relay contacts 46b, adjustable resistance 48 and fixed resistance 47 are series connected between conductors 25 and 30. The base electrode of transistor 34 is connected to this series circuit between resistor 44 and relay contacts 46b. Relay contacts 46a are in a circuit between the variable tap of potentiometer 22 and the junction of the base electrode of transistor 34 with the circuit which includes capacitor 45. The magnetizing coil 46 of the control relay is energized by alternating current from the same A.C. supply as bridge rectifier 21. The energization of the magnetizing coil 46 of the relay is controlled by switch 50.

During welding switch 50 is open and the actuating coil 46 of the relay is de-energized under which conditions contacts 46a are closed and contacts 46b are open.

As stated previously the welding current produced at the welding machine is controlled by the setting of potentiometer 22 which controls the amount of current passing through control winding 16. It is a characteristic of transistors that the impedance presented between collector and emitter is a minimum when the potential of the base electrode approaches the potential of the collector. In the circuit illustrated, the collector electrode of each of the transistors in the circuit is at the same potential as the variable tap of potentiometer 22. With the relay 46 de-energized and contacts 46a closed, it may readily be seen that the base electrode of transistor 34 is at the same potential as its collector. Under these conditions the base current is a maximum and the impedance between the collector and the emitter of transistor 34 is negligible, which effectively places the base of transistor 33 at the same potential as its collector. By similar reasoning, it may be shown that the base electrode 41 of the main control transistor 27 is at substantially the same potential as its collector 43. Under this circumstance the main control transistor 27 presents a negligible impedance to the flow of current in the circuit of the control winding 16. Since the transistor 27 is selected to be able to control a relatively heavy current, it is inherent that the base current is also relatively heavy.

It is also a well-known characteristic of transistors that when the base approaches the potential of the emitter electrode, the base current is minimum and the transistor presents maximum impedance between its collector and emitter. When the end of the weld has been reached switch 50 is closed energizing operating coil 46 of the control relay. This opens contacts 46a and closes contacts 46b. This has the effect of disconnecting one side of capacitor 45 from the variable tap of potentiometer 22 and reconnecting it to conductor 30 through adjustable resistance 48 and resistor 47. In effect capacitor 45 is now across the voltage that exists between the variable tap of potentiometer 22 and the junction point 23 at one end of the potentiometer. Because of the resistance in the circuit, the capacitor charges at a fixed and controlled rate and over a predetermined time the voltage on the base of transistor 34 changes from the voltage of the variable tap of potentiometer 22 to the voltage of conductor 30. It is also possible for the capacitor 45 to charge through the transistors. If the main control transistor were used alone without driver transistors 33, 34, the high base current of transistor 27 would permit rapid charging of capacitor 45, in effect short circuiting the resistors 47, 48. The two amplifying or driving transistors act to supply the necessary base current to transistor 27 while retaining the control of the charging rate of capacitor 45 in resistors 47 and 48. By minimizing the charging (base) current provided to the capacitor 45 through transistor 34, capacitor 45 can be kept relatively small and therefore is relatively inexpensive.

As capacitor 45 charges, the potential of the base electrode of each transistor approaches the emitter potential, the base current decays, and the collector to emitter impedance rises. This increasing impedance between the collector and emitter of control transistor 27 reduces the current in control winding 16 which in turn reduces the current output of the welding machine. The charging rate of capacitor 45, and hence the rate of welding current decay, is of course, controlled by the setting of adjustable resistance 48.

Switch 50, which controls the energization of the magnetizing core 46 of the control relay, is preferably an electrically operated switch which may be part of a whole weld sequence timing device.

The only function of resistor 44 is to prevent excessive current through the relay contacts when switch 50 is opened at the end of the entire weld cycle. At that time capacitor 45 is discharged through contacts 46a. Resistor 44 prevents a dead short circuit and is designed to avoid exceeding the current rating of the relay contacts.

By way of example the values of several of the components of the circuit described above are specified in the following table.

| Component | Value |
| --- | --- |
| Transistor 27 | Type XH10 (Minneapolis-Honeywell). |
| Transistor 33 | Type 2N141 (Sylvania). |
| Transistor 34 | Type 2N43 (Transitron). |
| Rectifier 32 | Silicon diode type N347 (Transitron). |
| Capacitor 45 | 8 microfarads (600 volts). |
| Resistor 44 | 10 ohms. |
| Resistor 48 | 2.5 megohms. |
| Resistor 47 | 10,000 ohms. |
| Potentiometer 22 | 12 ohms. |

The transistor control device described may obviously be applied to any type of welding machine in which the welding current is controlled by a control current. It is relatively simple and inexpensive, operates from available voltages is free of moving parts, and has a long life expectancy. While only one embodiment of the invention has been shown and described herein, it is to be understood that the invention is not limited to the particular form shown but may be used in other ways without departure from its spirit as defined by the following claim.

I claim:

A power supply for electric arc welding which comprises a source of welding current, a source of control current, a control current circuit supplied with current from said source of control current, means responsive to the magnitude of current flow in said control current circuit for varying the welding current output from said welding current source, and means for varying the magnitude of the current flow in said control current circuit, said last named means comprising a main control transistor which includes a collector, an emitter and a base and which is connected to have the current in said control current circuit flow therethrough as emitter current, a driver transistor which includes a collector, an emitter, and a base and which is connected to have its emitter current control the base current of said main control transistor, means for directly connecting the collector of said driver transistor to the collector connection of said main control transistor in said control current circuit, and means for controlling the base to emitter potential applied to said driver transistor at the end of a welding operation to cause a decay in the welding current output from said welding current source, said means including means operative during welding for connecting the base of said driver transistor to a point of the same potential as its collector, and means operative at the end of said welding for reconnecting the base of said driver transistor in a circuit including a capacitor and a resistor such that its said base potential shifts from its collector potential to its emitter potential at a rate determined by the time constant of said resistor-capacitor circuit.

References Cited in the file of this patent

UNITED STATES PATENTS

| | | |
| --- | --- | --- |
| 2,622,213 | Harris | Dec. 16, 1952 |
| 2,644,109 | Mulder | June 30, 1953 |
| 2,698,416 | Sherr | Dec. 28, 1954 |
| 2,751,549 | Chase | June 19, 1956 |
| 2,845,548 | Silliman et al. | July 24, 1958 |

OTHER REFERENCES

"Design Consideration for Semiconductor Regulated Power Supplies," Sherr and Levy, Electronic Design, July 15, 1956, pp. 22–25.